US012148002B2

(12) United States Patent
Celik et al.

(10) Patent No.: US 12,148,002 B2
(45) Date of Patent: Nov. 19, 2024

(54) AUTOMATIC AFTER CALL SURVEY AND CAMPAIGN-BASED CUSTOMER FEEDBACK COLLECTION PLATFORM

(71) Applicant: OnePIN, Inc., Westborough, MA (US)

(72) Inventors: Feyzi Celik, Hopkinton, MA (US); Marcin Nowak, Westborough, MA (US)

(73) Assignee: OnePIN, Inc., Westborough, MA (US)

( * ) Notice: Subject to any disclaimer, the term of this patent is extended or adjusted under 35 U.S.C. 154(b) by 0 days.

(21) Appl. No.: 17/231,800

(22) Filed: Apr. 15, 2021

(65) Prior Publication Data

US 2021/0233109 A1 Jul. 29, 2021

Related U.S. Application Data

(63) Continuation of application No. 15/567,042, filed as application No. PCT/US2016/030664 on May 4, 2016, now abandoned.
(Continued)

(51) Int. Cl.
*G06Q 30/0203* (2023.01)
*G06F 9/54* (2006.01)
(Continued)

(52) U.S. Cl.
CPC ........ *G06Q 30/0251* (2013.01); *G06F 9/542* (2013.01); *G06F 16/972* (2019.01);
(Continued)

(58) Field of Classification Search
USPC ...................................... 705/7.32
See application file for complete search history.

(56) References Cited

U.S. PATENT DOCUMENTS 6,216,014 B1 4/2001 Proust
6,628,770 B1 9/2003 Jain et al.
(Continued)

FOREIGN PATENT DOCUMENTS

WO WO2009/023591 2/2009
WO 2012047273 A1 4/2012
(Continued)

OTHER PUBLICATIONS

Long et al., Mechanism for generic purpose SIM card communication and its application, R&D Watchdata System Co. (Year: 2011).*
(Continued)

*Primary Examiner* — Allison M Robinson
(74) *Attorney, Agent, or Firm* — Giordano Law LLC; David A. Giordano

(57) ABSTRACT

This disclosure provides systems, methods, services, and platforms for automatically prompting a user of a mobile device to send feedback after a triggering event. This disclosure enables Mobile Network Operators to immediately solicit timely feedback from a mobile user after an interaction with the user. When a business, group, or other entity has an active survey campaign, a survey message comprising one or more response options is automatically sent to a mobile device after a triggering event occurs. Based on the user's selected response option, subsequent, follow-up survey messages can be automatically sent to the mobile device.

6 Claims, 9 Drawing Sheets

Related U.S. Application Data

(60) Provisional application No. 62/156,723, filed on May 4, 2015.

(51) Int. Cl.

| | | |
|---|---|---|
| *G06F 16/958* | (2019.01) | |
| *G06Q 30/01* | (2023.01) | |
| *G06Q 30/0201* | (2023.01) | |
| *G06Q 30/0207* | (2023.01) | |
| *G06Q 30/0242* | (2023.01) | |
| *G06Q 30/0251* | (2023.01) | |
| *G06Q 50/00* | (2012.01) | |
| *H04M 1/2757* | (2020.01) | |
| *H04M 1/72406* | (2021.01) | |
| *H04M 1/72448* | (2021.01) | |
| *H04M 3/42* | (2006.01) | |
| *H04M 3/493* | (2006.01) | |
| *H04M 7/00* | (2006.01) | |
| *H04M 15/00* | (2006.01) | |
| *H04W 4/14* | (2009.01) | |
| *H04W 4/16* | (2009.01) | |
| *H04W 4/60* | (2018.01) | |
| *H04W 8/18* | (2009.01) | |
| *H04W 8/26* | (2009.01) | |
| *G06F 16/955* | (2019.01) | |
| *G06Q 30/016* | (2023.01) | |
| *H04M 1/72445* | (2021.01) | |
| *H04W 4/00* | (2018.01) | |
| *H04W 4/21* | (2018.01) | |

(52) U.S. Cl.
CPC ......... *G06Q 30/01* (2013.01); *G06Q 30/0201* (2013.01); *G06Q 30/0203* (2013.01); *G06Q 30/0207* (2013.01); *G06Q 30/0245* (2013.01); *G06Q 30/0267* (2013.01); *G06Q 50/01* (2013.01); *H04M 1/2757* (2020.01); *H04M 1/72406* (2021.01); *H04M 1/72448* (2021.01); *H04M 3/42059* (2013.01); *H04M 3/42102* (2013.01); *H04M 3/42153* (2013.01); *H04M 3/42195* (2013.01); *H04M 3/42357* (2013.01); *H04M 3/42365* (2013.01); *H04M 3/4931* (2013.01); *H04M 7/0042* (2013.01); *H04M 15/58* (2013.01); *H04M 15/62* (2013.01); *H04M 15/705* (2013.01); *H04M 15/735* (2013.01); *H04M 15/7556* (2013.01); *H04M 15/80* (2013.01); *H04M 15/84* (2013.01); *H04M 15/844* (2013.01); *H04M 15/848* (2013.01); *H04M 15/852* (2013.01); *H04M 15/856* (2013.01); *H04W 4/14* (2013.01); *H04W 4/16* (2013.01); *H04W 4/60* (2018.02); *H04W 8/18* (2013.01); *H04W 8/26* (2013.01); *G06F 16/955* (2019.01); *G06Q 30/016* (2013.01); *H04M 1/72445* (2021.01); *H04M 2203/651* (2013.01); *H04M 2203/655* (2013.01); *H04M 2215/8158* (2013.01); *H04W 4/00* (2013.01); *H04W 4/21* (2018.02)

(56) References Cited

U.S. PATENT DOCUMENTS

| 6,741,687 | B1 | 5/2004 | Coppage |
|---|---|---|---|
| 7,406,332 | B1 | 7/2008 | Gaillard |
| 7,924,989 | B1 | 4/2011 | Cooper |
| 8,073,460 | B1 | 12/2011 | Scofield et al. |
| 8,175,921 | B1 | 5/2012 | Kopra |
| 8,249,627 | B2 | 8/2012 | Olincy et al. |
| 8,515,803 | B2 | 8/2013 | Meyer et al. |
| 8,712,371 | B2 | 4/2014 | Baker et al. |
| 8,934,876 | B1 | 1/2015 | Cohen |
| 8,971,860 | B1 | 3/2015 | Olincy et al. |
| 8,989,712 | B2 | 3/2015 | Wentker et al. |
| 10,540,693 | B1 | 1/2020 | Monsowitz et al. |
| 2002/0159387 | A1 | 10/2002 | Allison et al. |
| 2003/0065778 | A1 | 4/2003 | Malik |
| 2003/0182135 | A1* | 9/2003 | Sone ............... G06Q 30/02 705/304 |
| 2004/0252816 | A1 | 12/2004 | Nicolas |
| 2005/0064879 | A1 | 3/2005 | McAvoy |
| 2005/0186939 | A1 | 8/2005 | Barnea et al. |
| 2005/0233733 | A1 | 10/2005 | Roundtree et al. |
| 2005/0289095 | A1 | 12/2005 | Ruahala et al. |
| 2006/0015404 | A1 | 1/2006 | Tran |
| 2006/0212482 | A1 | 9/2006 | Celik |
| 2006/0271425 | A1 | 11/2006 | Goodman |
| 2006/0285661 | A1 | 12/2006 | Patel et al. |
| 2007/0047494 | A1 | 3/2007 | Cordone |
| 2007/0047523 | A1 | 3/2007 | Jiang |
| 2007/0055995 | A1 | 3/2007 | Jiang |
| 2007/0061197 | A1 | 3/2007 | Ramer |
| 2007/0106698 | A1 | 5/2007 | Elliott et al. |
| 2007/0111748 | A1 | 5/2007 | Risbood |
| 2007/0214083 | A1 | 9/2007 | Jones et al. |
| 2007/0281689 | A1 | 12/2007 | Altman et al. |
| 2007/0282959 | A1 | 12/2007 | Stern |
| 2008/0037738 | A1 | 2/2008 | Nolan et al. |
| 2008/0075249 | A1 | 3/2008 | Zach et al. |
| 2008/0090597 | A1 | 4/2008 | Celik et al. |
| 2008/0228572 | A1* | 9/2008 | Teterin ............ G06Q 30/02 705/14.64 |
| 2008/0261635 | A1 | 10/2008 | Samiri |
| 2008/0292080 | A1 | 11/2008 | Quon et al. |
| 2008/0318554 | A1 | 12/2008 | Romppanen et al. |
| 2008/0318555 | A1 | 12/2008 | Romppanen et al. |
| 2009/0111462 | A1* | 4/2009 | Krinsky ............ H04W 4/029 455/423 |
| 2009/0124271 | A1* | 5/2009 | Roundtree ........ H04M 1/72436 455/466 |
| 2009/0207983 | A1 | 8/2009 | Nour-Omid |
| 2009/0225972 | A1 | 9/2009 | Kahn |
| 2009/0265220 | A1 | 10/2009 | Bayraktar et al. |
| 2009/0270067 | A1 | 10/2009 | Johnson |
| 2009/0280786 | A1 | 11/2009 | Ziklik |
| 2009/0290688 | A1 | 11/2009 | Peters et al. |
| 2009/0290701 | A1 | 11/2009 | Portman et al. |
| 2009/0318122 | A1 | 12/2009 | White et al. |
| 2010/0022222 | A1 | 1/2010 | Li |
| 2010/0042911 | A1 | 2/2010 | Wormald et al. |
| 2010/0100387 | A1 | 4/2010 | Kuiken et al. |
| 2010/0161506 | A1 | 6/2010 | Bosenick et al. |
| 2010/0198696 | A1 | 8/2010 | Deshpande |
| 2010/0205436 | A1 | 8/2010 | Pezeshki |
| 2010/0311391 | A1 | 12/2010 | Siu et al. |
| 2010/0318415 | A1 | 12/2010 | Gottlieb |
| 2010/0325221 | A1 | 12/2010 | Cohen et al. |
| 2011/0029380 | A1 | 2/2011 | Moukas et al. |
| 2011/0044438 | A1 | 2/2011 | Wang et al. |
| 2011/0054920 | A1 | 3/2011 | Phillips et al. |
| 2011/0076989 | A1 | 3/2011 | Lynch |
| 2011/0119126 | A1 | 5/2011 | Park et al. |
| 2011/0131421 | A1 | 6/2011 | Jogand-Coulomb et al. |
| 2011/0151838 | A1 | 6/2011 | Olincy et al. |
| 2011/0151852 | A1 | 6/2011 | Olincy et al. |
| 2011/0287746 | A1 | 11/2011 | Gopinath et al. |
| 2012/0057689 | A1 | 3/2012 | Martin |
| 2012/0072261 | A1* | 3/2012 | Oberoi ............ G06Q 30/0203 705/7.32 |
| 2012/0084120 | A1* | 4/2012 | Hirsch ............ G06Q 30/02 705/7.32 |
| 2012/0101989 | A1 | 4/2012 | Ring et al. |
| 2012/0166271 | A1 | 6/2012 | Wofford et al. |
| 2012/0196564 | A1 | 8/2012 | Yi et al. |
| 2012/0238251 | A1 | 9/2012 | Lee et al. |
| 2012/0303455 | A1 | 11/2012 | Busch |
| 2012/0315880 | A1 | 12/2012 | Peitrow et al. |
| 2012/0316992 | A1 | 12/2012 | Oborne et al. |

(56) References Cited

U.S. PATENT DOCUMENTS

| | | | |
|---|---|---|---|
| 2013/0048710 A1* | 2/2013 | Marsico | G06F 16/9554 |
| | | | 235/375 |
| 2013/0060703 A1 | 3/2013 | Dala et al. | |
| 2013/0086618 A1 | 4/2013 | Klein et al. | |
| 2013/0115872 A1 | 5/2013 | Huang et al. | |
| 2013/0124257 A1* | 5/2013 | Schubert | G06Q 30/02 |
| | | | 705/7.29 |
| 2013/0130661 A1 | 5/2013 | Berner et al. | |
| 2013/0144674 A1 | 6/2013 | Kim et al. | |
| 2013/0204704 A1 | 8/2013 | Ross et al. | |
| 2013/0217360 A1 | 8/2013 | Dakin et al. | |
| 2013/0238706 A1 | 9/2013 | Desai | |
| 2013/0290820 A1 | 10/2013 | Dhanani | |
| 2013/0343543 A1 | 12/2013 | Blaisdell et al. | |
| 2014/0007214 A1 | 1/2014 | Qureshi et al. | |
| 2014/0024361 A1 | 1/2014 | Poon et al. | |
| 2014/0026069 A1 | 1/2014 | Dennis | |
| 2014/0057610 A1 | 2/2014 | Olincy et al. | |
| 2014/0073289 A1 | 3/2014 | Velasco | |
| 2014/0075567 A1 | 3/2014 | Raleigh et al. | |
| 2014/0089098 A1 | 3/2014 | Roundtree | |
| 2014/0136331 A1 | 5/2014 | Madhavapeddi | |
| 2014/0156386 A1 | 6/2014 | Williams | |
| 2014/0156992 A1* | 6/2014 | Medin | H04L 63/123 |
| | | | 713/168 |
| 2014/0161249 A1 | 6/2014 | Tolksdorf | |
| 2014/0188612 A1 | 7/2014 | Chou et al. | |
| 2014/0229238 A1 | 8/2014 | Meyer et al. | |
| 2014/0229277 A1 | 8/2014 | Khambete | |
| 2014/0229614 A1* | 8/2014 | Aggarwal | H04L 65/1063 |
| | | | 709/224 |
| 2014/0257985 A1 | 9/2014 | Gibson et al. | |
| 2014/0297402 A1 | 10/2014 | Soudak | |
| 2014/0304068 A1 | 10/2014 | Weinblatt | |
| 2014/0329514 A1 | 11/2014 | Meriaz | |
| 2014/0329565 A1 | 11/2014 | Mannix et al. | |
| 2015/0019307 A1 | 1/2015 | Girard et al. | |
| 2015/0038120 A1 | 2/2015 | Larkin | |
| 2015/0046331 A1 | 2/2015 | Gupta et al. | |
| 2015/0071427 A1 | 3/2015 | Kelley et al. | |
| 2015/0073891 A1 | 3/2015 | Dauneria | |
| 2015/0082212 A1 | 3/2015 | Sharda | |
| 2015/0106267 A1 | 4/2015 | Lee | |
| 2015/0149301 A1 | 5/2015 | Dow | |
| 2015/0180733 A1 | 6/2015 | Krutzler et al. | |
| 2015/0201313 A1 | 7/2015 | Celik et al. | |
| 2015/0256672 A1 | 9/2015 | Collart | |
| 2015/0327042 A1 | 11/2015 | Kempf et al. | |
| 2015/0356548 A1 | 12/2015 | Luna-Rodriguez et al. | |
| 2016/0014579 A1 | 1/2016 | Sudarsan et al. | |
| 2016/0048937 A1 | 2/2016 | Mathura et al. | |
| 2016/0063528 A1 | 3/2016 | Zhang | |
| 2016/0086160 A1 | 3/2016 | Desai et al. | |
| 2016/0135048 A1 | 5/2016 | Huxham et al. | |
| 2016/0269923 A1* | 9/2016 | Celik | H04W 4/06 |
| 2017/0004517 A1* | 1/2017 | Jaggi | G06Q 30/0203 |
| 2017/0228789 A1 | 8/2017 | Macgillivray | |
| 2018/0007198 A1 | 1/2018 | Rabra et al. | |
| 2018/0032997 A1 | 2/2018 | Gordon et al. | |

FOREIGN PATENT DOCUMENTS

| | | |
|---|---|---|
| WO | 2012047273 A9 | 4/2012 |
| WO | 2014049322 A1 | 4/2014 |
| WO | WO2014/049322 | 4/2014 |

OTHER PUBLICATIONS

International Search Report and Written Opinion, mailed May 1, 2015, International Application No. PCTUS2015/010860, filed Jan. 9, 2015, 17 pages.

International Search Report and Written Opinion, mailed Jun. 3, 2016, International Application No. PCT/US2016/013112, filed Jan. 12, 2016., 15 pages.

International Search Report and Written Opinion, mailed Aug. 11, 2016, International Application No. PCT/US2016/30634, filed May 4, 2016, 15 pages.

International Search Report and Written Opinion, mailed Aug. 11, 2016, International Application No. PCT/US2016/30664, filed May 4, 2016, 15 pages.

International Search Report and Written Opinion, mailed Aug. 12, 2016, International Application No. PCT/US2016/30612, filed May 3, 2016, 19 pages.

International Search Report and Written Opinion, mailed Aug. 12, 2016, International Application No. PCT/US2016/30699, filed May 4, 2016, 15 pages.

International Search Report and Written Opinion, mailed Sep. 16, 2016, International Application No. PCT/US2016/30764, filed May 4, 2016, 13 pages.

International Search Report and Written Opinion, mailed Aug. 18, 2016, International Application No. PCT/US2016/30859, filed May 4, 2016, 12 pages.

International Search Report and Written Opinion, mailed Jul. 25, 2016, International Application No. PCT/US2016/21540, filed Mar. 9, 2016, 17 pages.

SIM Application Toolkit—Protocol Conformance and Implementation Challenges, Jain et al., 0-7695-2629—Feb. 6, 2006 IEEE.

The Research of Event-Triggered Application in Proactive SIM Card, Peng et al., 978-1-4244-3693—Apr. 9, 2009 IEEE.

Chung-Hwa Rao et al., iSMS: An Integration Platform for Short Message Service and IP Networks, IEEE Network (vol. 15, Issue: 2, Mar.-Apr. 2001).

\* cited by examiner

AUTOMATIC AFTER CALL SURVEY AND CAMPAIGN-BASED CUSTOMER FEEDBACK COLLECTION PLATFORM

CROSS-REFERENCE TO RELATED APPLICATIONS

This application is a continuation application of co-pending U.S. application Ser. No. 15/567,042, filed Oct. 16, 2017 as a national stage entry application of International App. No. PCT/US16/30664, filed May 4, 2016, which application claims priority to U.S. Provisional Patent App. No. 62/156,723, filed May 4, 2015. The entire contents of those applications are incorporated herein by reference.

FIELD

This application relates to mobile devices and mobile networks. Specifically, this application relates to data pertaining to mobile devices and mobile networks.

BACKGROUND

Customer feedback is more than simply a valuable tool in improving products and services. It is an imperative-a necessary facet of any company's continuous improvement plan. Most companies recognize that soliciting feedback related to customer service or a consumer's overall experience is best sought as close to the company-consumer interaction as possible. As a result, companies have implemented various mechanisms to collect this feedback such as web surveys, live surveys during a phone call, or mail-in surveys. Some companies employ market research firms that engage in outbound calling campaigns to customers to gauge effectiveness and overall brand impression. While all of these are valuable, they often have limited responses because people view each mechanism as too time consuming and simply not worth the effort. Consumers often do not wish to stay on a phone line longer to answer several questions after they have already conducted their necessary business. The same is true for web sessions that launch after the web transaction with the company is complete. Typically, these types of surveys take up to a minute or more to complete. Giving a company sixty seconds of undivided attention to provide feedback is often considered an unpalatable effort by customers. Outbound calling campaigns where a consumer is targeted are often the least impactful, as they are even more time consuming for a customer. In fact, some of the most valuable customers are never reachable with these methods, resulting in a skewed data set and an imperfect feedback loop. Often, only customers with an exceptionally poor experience take the time to voice their opinions. While this is valuable, a full circle picture is not obtained and product managers and service department heads within companies have limited data available to make fact-based analytical decisions about improving their products and services. A solution that enables a consumer to give near real-time responses after his experience that takes only a matter of seconds allows companies to collect immediate feedback from a wide range of consumers. Such a solution is a novel approach to a basic need in the market.

SUMMARY

One aspect of this disclosure provides a computer-implemented method for automatically prompting a mobile device user to provide feedback after a triggering event. The method comprises: receiving, at the processor in the mobile phone, an indication that a triggering event has occurred; receiving at the mobile device a first survey message comprising one or more first actionable response options; and displaying the first survey message on the screen of the mobile device. In some embodiments, the method also comprises playing an alert tone on the mobile device when the survey message is displayed.

In some embodiments, the triggering event is selected from the group consisting of a phone call placed from the mobile device to a first phone number, a phone call received at the mobile device from a second phone number, navigation to a specific web address on the mobile device, and navigation away from a specific web address on the mobile device. In certain embodiments, the triggering event is a phone call placed from the mobile device to a first phone number.

In some embodiments, the survey message is selected from the group consisting of binary SMS, flash SMS, MMS, standard SMS, USSD notification, and email.

In some embodiments, the method further comprises launching an application installed on the mobile device, wherein the application causes the first survey message to be displayed. In certain embodiments, the application causes the alert tone to be played on the mobile device. In some embodiments, the application is installed on the SIM card of the mobile device. In other embodiments, the application is installed on the operating system of the mobile device.

In some embodiments, the method further comprises receiving, in the application, the first actionable response option selected on the mobile device.

In further embodiments, the method further comprises displaying a second survey message comprising one or more second actionable response options. In some embodiments, the method further comprises: receiving, in the application, the second actionable response option selected on the mobile device; and sending a communication comprising the second actionable response option selected on the mobile device. In some embodiments, the communication further comprises the first actionable response option selected by the user.

In some embodiments, the method further comprises: sending a communication comprising the first actionable response option selected on the device; receiving at the mobile device a second survey message comprising one or more second actionable response options; and displaying the second survey message on the screen of the mobile device. In further embodiments, the method also comprises sending a communication comprising the second actionable response option selected by the user.

In certain embodiments, the method further comprises: receiving, in the application, the second survey message comprising one or more second actionable response options; and receiving, in the application, the second actionable response option selected on the mobile device; and sending a communication comprising the second actionable response option selected on the mobile device.

Another aspect of this disclosure provides a computer-implemented method for automatically prompting a user to provide feedback on a mobile device after a triggering event, the method comprising: receiving, at a server, an indication that a triggering event has occurred; receiving, at the server, an indication that the triggering event matches a triggering event stored in a database operably connected to the server; receiving, at the server, a communication comprising the Mobile Station International Subscriber Directory Number of the mobile device; preparing a first survey message comprising one or more first actionable response options; and sending the first survey message to the mobile device.

In some embodiments, the triggering event is selected from the group consisting of a phone call placed from the mobile device to a first phone number, a phone call received at the mobile device from a second phone number, navigation to a specific web address on the mobile device, and navigation away from a specific web address on the mobile device. In certain embodiments, the triggering event is a phone call placed from the mobile device to a first phone number.

In some embodiments, the survey message is selected from the group consisting of binary SMS, flash SMS, MMS, standard SMS, USSD notification, and email.

In some embodiments, the method further comprises: receiving information about the triggering event, the information comprising the destination address of the triggering event; comparing the destination address to destination addresses stored in a database; and determining whether the destination address matches an active survey campaign.

In some embodiments, the method further comprises: receiving, at the server, a communication comprising the first actionable response option selected on the mobile device; preparing a second survey message comprising one or more second actionable response options; and sending the second survey message to the mobile device. In some embodiments, the method also comprises determining whether the first actionable response option selected on the mobile device indicates a desire to receive another survey message. In certain embodiments, the method further comprises logging the first actionable response option selected by the user.

In some embodiments, the method additionally comprises: preparing a second survey message comprising one or more second actionable response options when the first actionable response option selected by the user indicates a desire to receive another survey message; and sending the second survey message to the mobile device. In further embodiments, the method further comprises: receiving, at the server, a communication comprising the second actionable response option selected on the mobile device; logging the second actionable response option selected on the mobile device; preparing a final message; and sending the final message to the mobile device. In certain embodiments, the method additionally comprises receiving, at the server, a communication comprising the second actionable response option selected by the user. In some embodiments, the method further comprises logging the second actionable response option selected by the user.

In some embodiments, the method also comprises: preparing a final message; and sending the final message to the mobile device.

DETAILED DESCRIPTION

Figure 1:
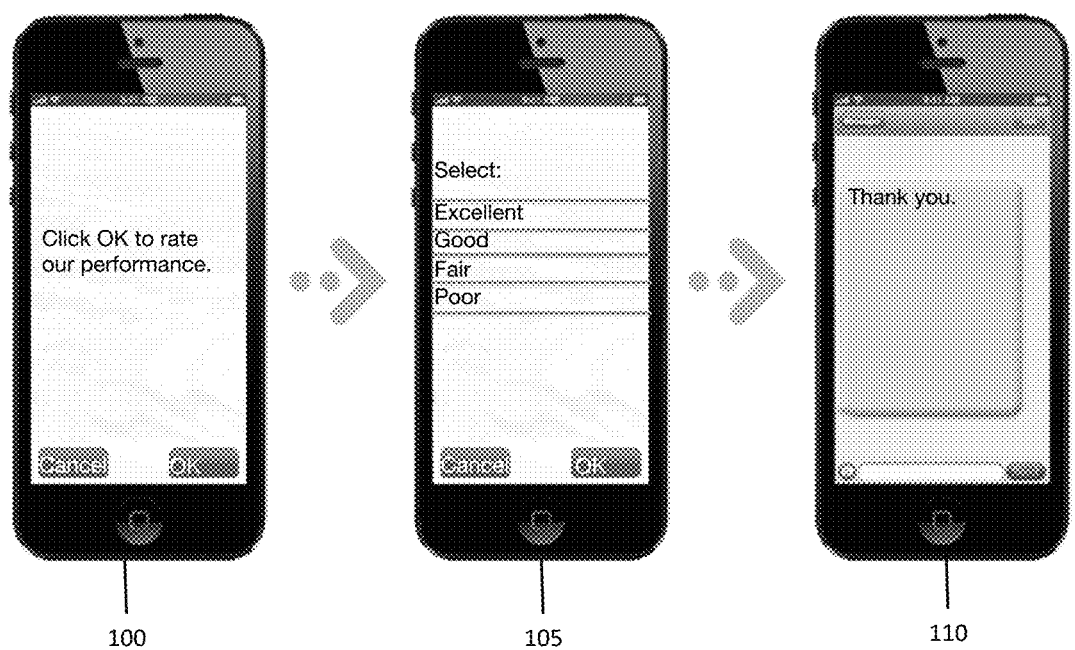
FIG. 1 is a graphical overview illustrating the user interface by which a user may provide feedback to a business or brand via an interactive prompt after a phone call or web session event.

This application provides aspects and embodiments of OnePIN's Survey Xpert™ platform. The term "Survey Xpert" is used throughout this application to refer to multiple aspects and embodiments of the methods, applications, services, systems, and platforms disclosed herein. The name "Survey Xpert" is not limited to any specific embodiment and can refer to multiple embodiments or individual embodiments. Furthermore, other names are also used to refer to embodiments described herein.

As used herein, the terms "a" and "an" mean one or more than one.

Aspects and embodiments of Survey Xpert enable enterprises and small businesses to collect immediate customer feedback and determine customer service satisfaction levels when consumers call into a business line from a mobile phone, when a consumer receives a call from a business on their mobile phone, or when a consumer visits a business or brand web page on their mobile device. In the after-call embodiments, the service automatically detects that a specific phone number for a business or enterprise was dialed by the mobile subscriber, or that the mobile consumer received a call from a designated business. At the end of the phone call, the mobile subscriber is prompted to answer several survey questions via a simple interactive interface that could be related to any of the following:

Level of service received
Feelings about the call
General customer service satisfaction
General product or service feedback
Inquiries/interest about new products or services offered by the company
Inquires related to receiving future promotions, coupons or product information The consumer receives a text based prompt immediately after the phone call. In other embodiments, the prompt could also contain logos, images, photos, pictures, music, weblinks, or other multimedia communications. The consumer is able to answer a single question, or a series of questions depending on the campaign with only a few clicks. The mobile user does not need to open any additional mobile applications, navigate to an SMS or email inbox, or type any information on the device in order to provide a response to the survey campaign.

The service is preferably used with a mobile phone, but can also be used with other devices that can be configured to make phone calls. For example, tablets and other computers that include Skype or Google Voice can be utilized with the services.

Example: Linda calls Visa customer service to inquire about a charge on her credit card statement. At the conclusion of her call, she is asked via a prompt on her mobile phone to provide feedback on the service interaction she just encountered with Visa. The survey feedback prompt is fully customizable by the business or enterprise collecting the feedback, in this case, Visa. In an exemplary embodiment, the survey prompt Linda sees on her phone reads:

How was your experience today with Visa?
Fast and easy
As expected
On hold for too long
Poor Linda chooses "On hold for too long." The Survey Xpert application on Linda's mobile phone submits this selection to the cloud platform. The cloud communicates with the application on the mobile phone. In this instance, based on Linda's selection, a follow-up question is generated by the cloud and sent to Linda's mobile phone. Linda sees:

How long was your hold time?
About 1 minute
2-3 minutes
3-5 minutes
Greater than 5 minutes Linda makes another selection: "3-5 minutes." This selection is again transmitted to the cloud platform. Next, Linda receives a final message. This message arrives on her mobile phone as an SMS, and states:

"Thank you for your feedback. You have been entered to win a $100 prepaid Visa gift card in our monthly drawing. More details can be found at www.visa.com/surveyrewards"

The number of survey questions and follow-up questions based on customer responses is flexible and can be determined by the business or enterprise collecting the customer feedback. The final thank you message is also fully customizable. In this example, the thank you message is sent as an SMS message (commonly known as a text message) to Linda's mobile phone from the Survey Xpert cloud platform. Notably, other messaging types can also be used. For example, the cloud could be configured to send an e-mail, an instant message, an MMS message, a USSD message, or a Facebook message. Additionally, it could Tweet a message (e.g., via Twitter), send an iMessage, send a What's App message, or any other message using an IP based backbone. Messages could also be sent via existing mobile applications such as Viber, Snap Chat, Instagram, or What's App. The type of message sent may or may not be dependent on the type of mobile device that Linda used to make the phone call, or the type of device that Linda has used in the past and which is registered with the Survey Xpert platform.

Benefits for the Business/Enterprise/Entity:

Simplicity: Establishing survey campaigns is a simple and straightforward process for businesses. They can easily collect customer feedback in a very simple fashion without needing to employ an outside firm or to a large number of resources.

Immediacy: Businesses and enterprises receive valuable customer feedback very promptly, and can adjust and address service performance issues very quickly. The feedback "loop time" is shortened, enabling businesses to improve their overall service levels.

Customization: Businesses can tailor their surveys for a large array of uses. They are able to collect a wide range of customer feedback related to customer service as well as new product introductions and general customer satisfaction. Survey questions can be changed mid-campaign based on responses already received.

Wide Reach: Enterprises are able to collect customer feedback from a vast array of customers across multiple segment types. Especially in developing areas, this is key as many survey participants may not have access to a computer or landline phone or physical store location (i.e., typical ways in which customer feedback is traditionally collected). However, these customers do have mobile phones, and can be valuable participants in the feedback process.

Real, Unfiltered Customer Feedback: Measuring customer service performance and satisfaction is becoming more important, especially in an increasingly automated customer service environment. With SurveyXpert, businesses receive real responses from customers in an unbiased fashion.

High Value: Billing models can be structured such that businesses only have to pay for actual responses received from mobile subscribers.

Extend Brand Awareness: Businesses are continually looking for ways to further their relationship with customers. Survey Xpert gives them another positive touch point with customers and provides the business with an opportunity to deepen the connection.

Benefits for Mobile Operator:

Revenue Generating Service: Mobile Network Operators (MNOs) are able to offer a differentiating service to their Business and Enterprise customers. Enterprises pay for valuable customer feedback, creating a significant revenue generator for MNOs, as each customer survey response represents a billed event.

Benefits for the Mobile Subscriber

Relevance: Customers can provide immediate feedback on their experiences. The survey questions posed to the mobile subscriber are timely and directly relevant to the interactions with the company the customer just experienced.

Interoperability: The services work across all mobile devices so subscribers have a similar experience regardless of what type of mobile device or tablet they are using.

The Survey Xpert platform includes a web interface that enables businesses, enterprises, marketers, or platform administrators to log in and define a "campaign." Within the campaign event, businesses or mobile operators can enter relevant information including, but not limited to, the target phone number(s) that will trigger the survey campaign when called and the timeframe during which a campaign will be relevant.

The user interface specifics (i.e., the wording mobile consumers will see) can be entered via the web interface. This includes the set of questions the business or other entity would like to ask its customers after a call to the business has ended. The business/enterprise/entity is also able to specify the maximum number of people it would like surveyed in a single day, and the length of time (days or hours) the survey campaign should be executed. The business also has the opportunity to set a regional campaign, based on a calling party's area code. In this instance, the business can set a campaign where only customers in a specific geographic region (as determined by their mobile area code where applicable) are targeted for surveys. Other geographic campaigns can be configured based on cell tower location. As used herein, the term "business" refers to any business, corporation, non-profit entity, political campaign, partnership, company, or other entity. Each of these entity types can use and benefit from Survey Xpert.

In some embodiments, the Survey Xpert cloud (server) is connected to a mobile network operator's call switch via an Application Programming Interface (API). Alternatively, the cloud platform can also be connected to the mobile operator's billing platform via an API, depending on the operator's network structure. When a designated campaign number is dialed (i.e., a business's phone number), the API informs the cloud platform. In some embodiments, the business phone number and the mobile subscriber's phone number (MSISDN) are both passed to the Survey Xpert platform via the API, in addition to the date and time.

When the Survey Xpert cloud receives communications via the API, the business phone number is checked to determine which campaign should be executed (as there can, in some instances, be multiple campaigns for different businesses running on the platform at the same time). In some embodiments, the platform also checks the caller's phone number to determine if the calling party has opted out from receiving Survey Xpert prompts. The opt out process is explained in further detail below. If the calling party has opted out of the service, then processing ends and no further communications are sent to the calling party.

If the calling party is not on the opt-out list, then an appropriate campaign message is prepared based on the configuration criteria and sent to the mobile subscriber. Here, this communication is described as an SMS which triggers a remote application on the calling party's mobile phone. This could be a binary SMS, standard text SMS, a specialized (flash, class 1) SMS, or a class 2 SMS which the handset passes to a SIM card within the device. Alternatively, communications can occur via MMS, email, USSD, or via other web-based communications channels between the mobile phone and the Survey Xpert platform.

When the message is received on the calling party's mobile device, the client application displays the prompt the caller. In an exemplary embodiments, the can see the following displayed on the screen of the mobile device:

Rate the service level you just received:
5=Exceptional
4=Very Good
3=Satisfactory
2=Disappointing
1=Very Poor The user is able to navigate through the menu and select a response, which is then sent back to the Survey Xpert cloud via the application. Communication back to the cloud can be via a data channel, SMS, MMS, etc.

The above embodiments can also be implemented in a manner where a client application (either on the phone or on the SIM card) is not required. In this instance, a USSD channel is opened and the communications between the mobile subscriber and the Survey Xpert platform occur via USSD communications.

In some embodiments, the Survey Xpert platform collects the device type of the respective mobile devices and can send a message to the respective client applications to "turn off" the Survey Xpert client application in mobile devices that have known issues and/or bugs that interfere with the service.

Intelligent Campaign Based Approach

In addition to after-call techniques, Survey Xpert campaign can be conducted in an intelligent campaign manner. In some embodiments, the Survey Xpert platform is able to track calls that individual subscribers make to businesses. If a business would like to run a campaign at a later date, subscribers who have called that business in the past can be targeted. This makes the prompts to the mobile subscribers relevant, as a previous relationship with the company had already been established by the mobile consumer. Consumers targeted in this manner receive a prompt, similar to that outlined in the before mentioned embodiments. The intelligent campaigns can be arranged to run a predefined dates and times, and for selected groups of subscribers in a regional area based on the subscriber's area code.

Opt-Out Process

In some embodiments, when a subscriber receives a message from the Survey Xpert platform, he or she has the option not to reply. The platform has the intelligence to count the number of rejections and, based thereon, can ask the subscriber if he or she would like to opt-out of the service if the service is not being used. The opt-out counters for the subscribers who have used the service and for the subscribers who have never used the service can be different.

FIG. 1 showcases the user interface a mobile consumer would see when the Survey Xpert service triggers and displays prompts to the consumer after a phone call or other triggering event. Prior to stage 100, a phone call placed to a business currently running a Survey Xpert campaign disconnects. After the disconnection, an interactive prompt displays. In some embodiments, the mobile device also plays a tone in conjunction with displaying the interactive prompt.

In some embodiments, the text displayed on the mobile device is configurable by the company or business that was called. In this example, a mobile user calls the Visa Customer Service department to inquire about a charge on her credit card. After the phone call, the mobile user sees an automatic, interactive prompt on her handset directly on the screen. She is asked to rate her experience with Visa.

In the embodiment where the mobile user interacts with the campaign message and chooses to provide feedback, she is given a list of options from which to choose in stage 105. Selecting one sends a communication back to the cloud platform with the selection. The session may continue with additional questions, or may end at this point. In some embodiments, the mobile user may receive a follow-up SMS message or other communication as shown in stage 110 thanking the user for participating.

Figure 2:
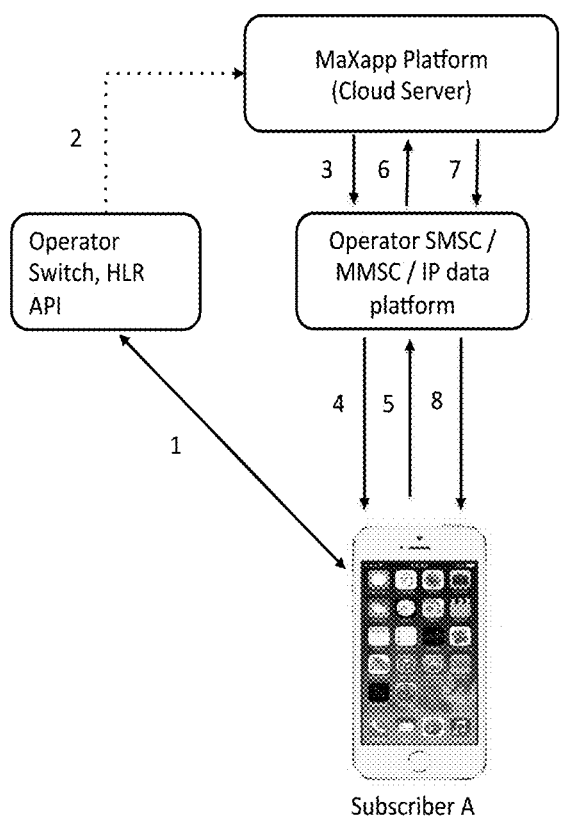
FIG. 2 is a flowchart illustrating the basic architecture of the Survey Xpert platform.

FIG. 2 is a flowchart illustrating the basic architecture of the Survey Xpert platform. In the embodiment of FIG. 2, Survey Xpert utilizes the following connectivity structure:

Mobile Subscriber A calls a number defined in the Survey Xpert target database ("1"). The Operator Switch or HLR (Home Location Registry) are in communication with the Survey Xpert platform ("2"). This allows for the Mobile Operator Network to notify the Survey Xpert platform when a specific target phone number is dialed.

After a target phone number is dialed and subsequently, the required information necessary to trigger a campaign is passed to the Survey Xpert platform (in some embodiments, via an API). Then, the platform processes the information and prepares a campaign message to be sent to a mobile subscriber.

In one embodiment, the Survey Xpert platform is connected to a Mobile Network Operator SMSC (Short Message Service Center) via an SMPP (Short Message Peer-to-Peer) connection ("3"). Other connection types in other embodiments are also possible. In some embodiments, the platform may also be connected to an MNO's MMSC (MultiMedia Message Service Center).

The Operator SMSC forwards the Survey Xpert campaign message to Subscriber A's device ("4").

The campaign message appears on Subscriber A's device as exemplified in FIG. 1, at which point the subscriber selects his or her preferred option.

The Survey Xpert remote application within Subscriber A's mobile device forwards the response to a designated short code at the Operator SMSC ("5").

The Operator SMSC receives and forwards the response to the Survey Xpert platform ("6"). In some embodiments, the SMSC forwards the message in the form of a binary SMS message.

In some embodiments, the platform parses the message and determines an appropriate response to Subscriber A based on Subscriber A's initial response. Subsequent follow-up questions may be sent, or a thank you SMS may be sent.

In the instance where a follow-up question is sent to the user, or in the case where a final SMS thank you message is sent to the user, the platform would send a message back to the subscriber (although neither the follow up message nor the thank you message are required). These messages would flow through the MNOs SMSC and MMSC respectively ("7").

The Operator SMSC forwards the message to the device user "(8)".

Figure 3:
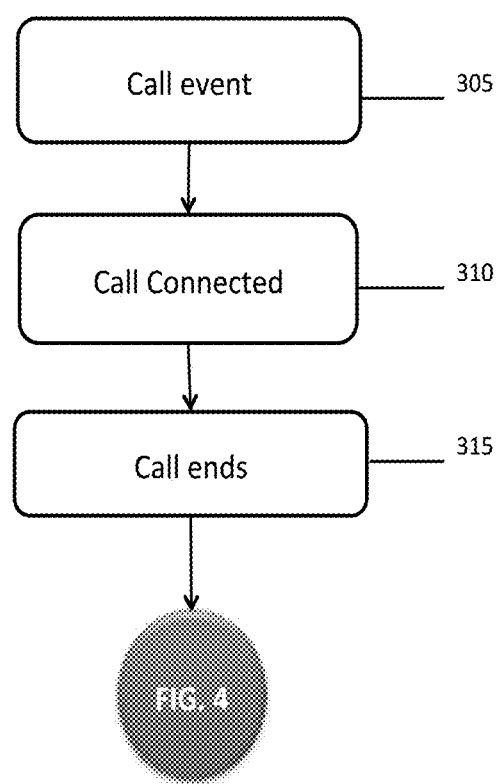
FIG. 3 is a flowchart illustrating the steps related to a phone call event that will lead to the eventual triggering of Survey Xpert.

FIG. 3 is a flowchart illustrating the steps related to a phone call event that will lead to the eventual triggering of the Survey Xpert service. In stage 305, a mobile subscriber either places a call, or receives a call from a company, brand, business, or other group that created a targeted survey campaign. In stage 310, the call connects. A connected call can have a multitude of scenarios including speaking with an actual individual, interacting with an automated voice response system, or connecting to a recorded message or voice mail system. In all cases, the call will end as signified by stage 315. At this point, the call is disconnected and communication between the Survey Xpert platform and the Mobile Operator's network continue, as outlined in FIG. 4.

Figure 4:
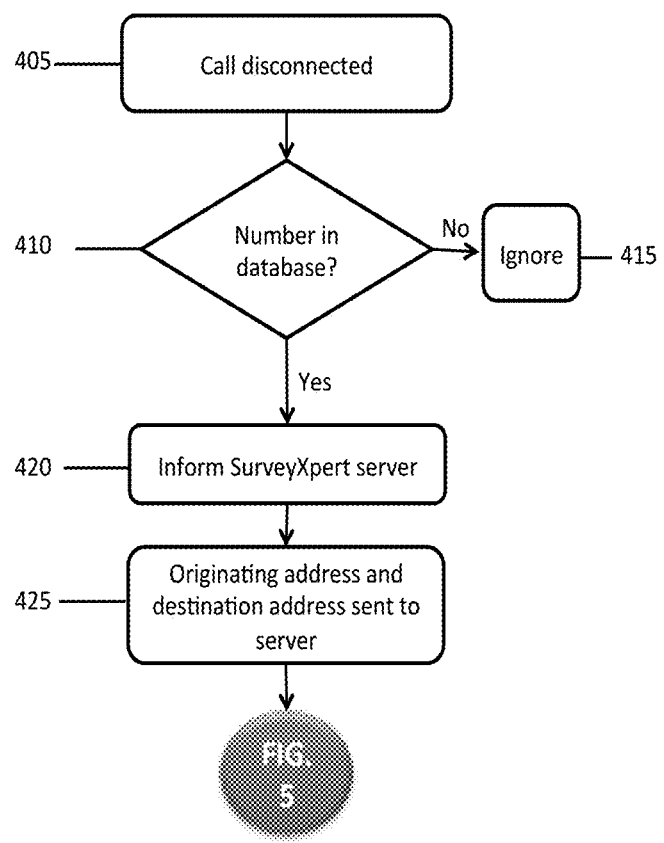
FIG. 4 is a flowchart illustrating the Mobile Operator network as it would interact with the Survey Xpert platform.

FIG. 4 is a flowchart illustrating the interactions between the Mobile Operator Network and the Survey Xpert platform. In stage 405, a phone call is disconnected. The Call Disconnect is a formal event recognized by the Mobile Operator network. This can be a caller initiated Call Disconnect, or may be a Network Originated Call Disconnect Event, meaning the called party terminates the call or the network is not able to maintain the call and the call drops. In some embodiments, when the call ends, the Mobile Operator network will automatically check the phone number dialed to determine if it is a number associated with a Survey Xpert campaign. In some embodiments, this information is stored within a database in the Mobile Operator's Network. In other embodiments, the information can be stored within the Survey Xpert platform with regular communications between the MNO network and the Survey Xpert platform via web services or APIs. (Application Programming Interfaces). If the phone number dialed in this embodiment does not have an Survey Xpert campaign defined, then the flow ends as shown in stage 415, and no further processing continues. If the phone number called is associated with a campaign, then the Mobile Operator network informs the Survey Xpert platform of the calling event as outlined in stage 420. Relevant information to execute the survey campaign is then passed from the Mobile Operator network to the platform. This information includes the calling party's mobile MSISDN (Mobile Station International Subscriber Directory Number). In some embodiments, the calling party's mobile phone number is also known as the OA, or Originating Address. In some embodiments, the Mobile Operator network may also provide time and date to the Survey Xpert platform. In some embodiments, the called phone number, also referred to as the DA or Destination Address, is also sent to the platform. This number may be a mobile phone number dialed, an international number, a landline or fixed number, a 1-800 phone number, a 1-900 phone number, an abbreviated number such as those used for emergency services such as 911, a short-code number often used in the mobile industry for Short Message Service (SMS) communications or any other number or address mechanism used for connecting two or more parties to communicate. The Survey Xpert platform then continues processing, as outlined in FIG. 5.

Figure 5:
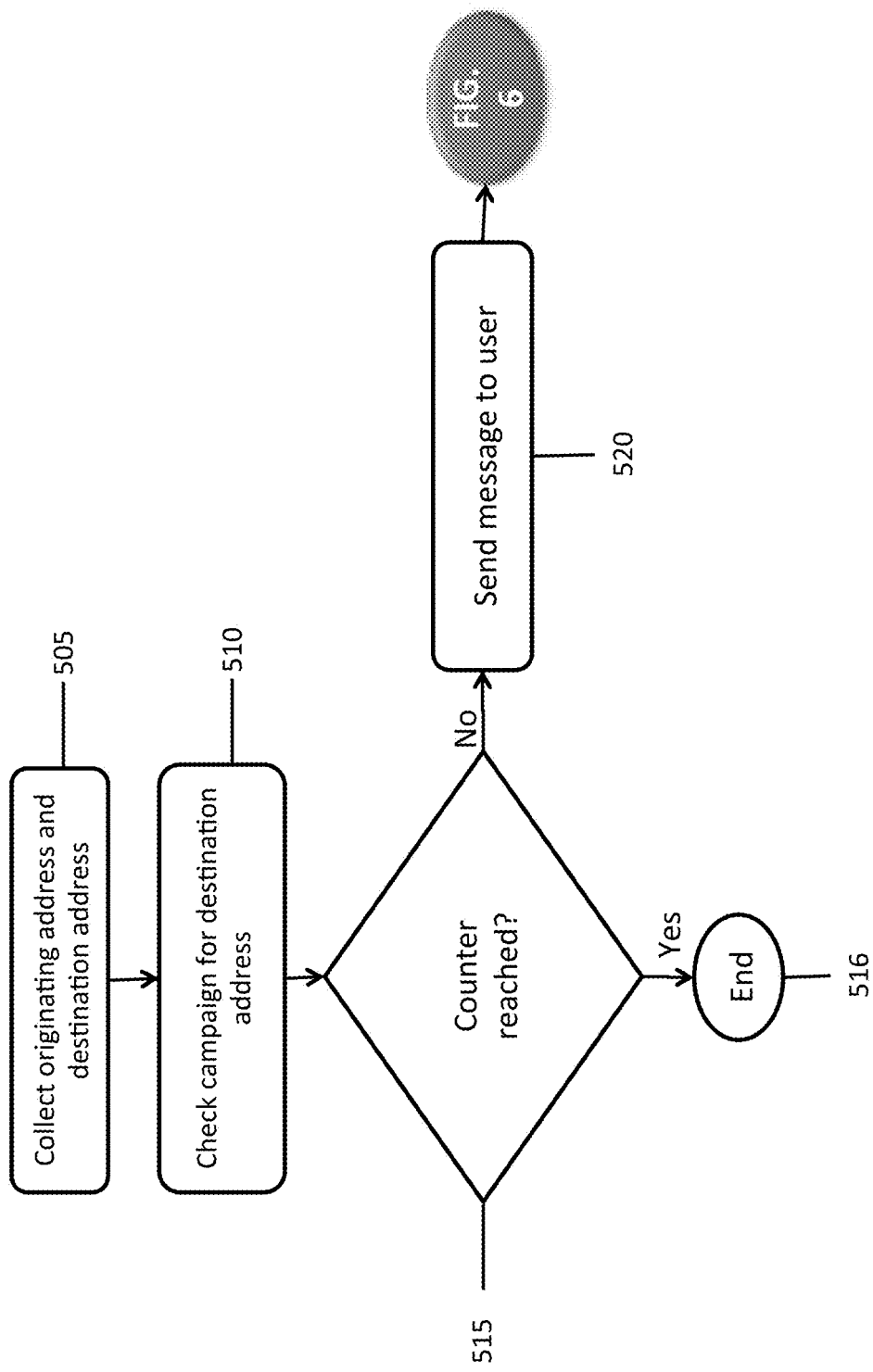
FIG. 5 is a flowchart illustrating the exemplary process of the logic the Survey Xpert platform uses to determine if a campaign message should be sent to a specific targeted mobile subscriber.

FIG. 5 is a flowchart illustrating an exemplary embodiment of the logic process that the Survey Xpert platform uses to determine if a campaign message should be sent to a specific targeted mobile subscriber. In some embodiments, the Survey Xpert platform receives the Origination Address, Destination Address, and other information including date and time from the MNO network as shown in stage 505. In other embodiments, the SurveXpert platform only receives the Destination Address initially. In stage 510, the Survey Xpert platform performs a check for the Destination Address, for example to determine if the campaign is still relevant and/or to determine if the date and time settings fall within preconfigured allowable ranges. At stage 515, the Originating Address, is also checked by the platform. If the Survey Xpert platform only initially received the Destination Address, then, in some embodiments, the Survey Xpert platform requests and obtains the Origination Address after determining that a campaign is active and relevant. Returning to stage 515, the Survey Xpert platform checks to determine if the mobile subscriber has opted out of receiving message notifications. In some embodiments, a mobile subscriber may opt out of receiving any Survey Xpert notification for any brand, company, business, or group called. In other embodiments, the Survey Xpert platform and remote application residing within the mobile subscriber's device are configured to allow the user to manage which brands, businesses, companies, and groups he would like to receive Survey Xpert notifications from after phone calls. In stage 515, in some embodiments, the Survey Xpert platform is also checking to ensure that the mobile subscriber has not exceeded pre-configurable counters. In this embodiment, the counters track the number of total Survey Xpert notifications the user has received. In some embodiments, the Survey Xpert platform checks the number of notifications received over a given timeframe, for all brands, for specific brands, for all phone numbers called, and/or for specific phone numbers dialed. This tracking ensures that the user does not receive an overabundance of survey messages in a short time period, which could lead to him opting out of all notifications in the future. If the user has exceeded the allowable limit, the processing ends as outlined in stage 516. In some embodiments, this limit may be set by the user. In other embodiments, the limit may be set by a network administrator managing the platform and overall user experience. In the embodiment where the mobile user has not exceeded the predefined counter limits, a Survey Xpert message is prepared by the platform and sent to the mobile subscriber at stage 520. The message sent could be a standard SMS, binary SMS, a class 2 SMS which will directly communication with a SIM (Subscriber Identity Module) card within the mobile subscriber's mobile device, an MMS message, a USSD message, or a web message sent over an IP (Internet Protocol) network. Processing on the calling party's device then ensues, as depicted in FIG. 6.

Figure 6:
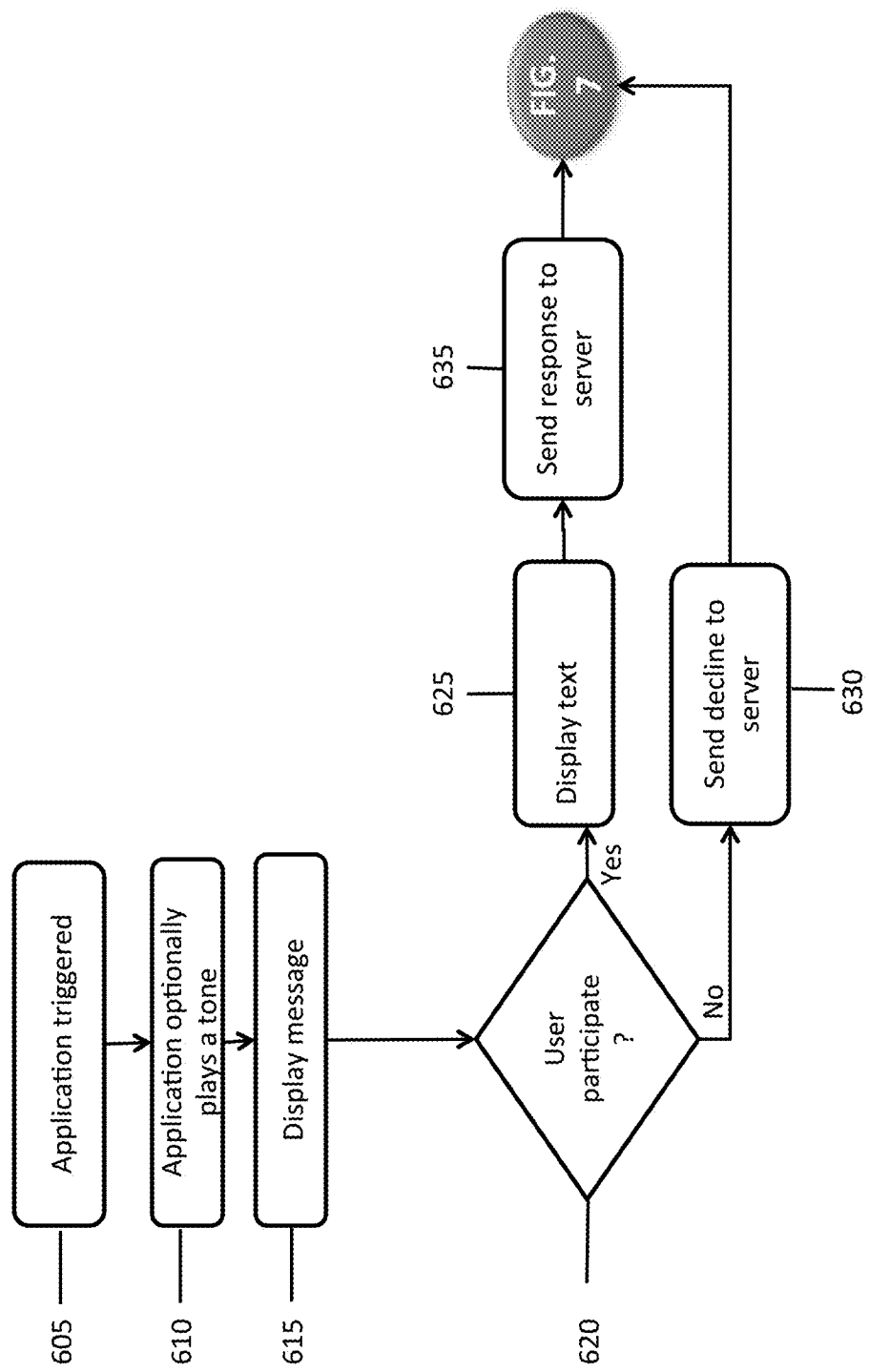
FIG. 6 is a flowchart illustrating the exemplary process of how the Survey Xpert application is expressed and interacts with the user device, and thus the user experience.

FIG. 6 is a flowchart illustrating an exemplary embodiment of interactions and expressions of the Survey Xpert application on a mobile device. This embodiment illustrate the user experience. In stage 605, the Survey Xpert remote application is triggered on the mobile user's device. In some embodiments, the application may play a configurable tone as shown in stage 610. In some embodiments, this tone can be configured by the mobile user. In other embodiments, the tone can be configured by the platform administrator. The tone can also be turned off for specific subscribers, for specific campaigns, or for certain device types. After the tone is played, the campaign message is displayed to the calling party as shown in stage 615. The text shown to a mobile user is fully configurable and can contain letters, numbers, special characters and punctuation, or may contain UCS2 Unicode encoded characters such as Greek, Cyrillic, or Mandarin characters as an example. In this embodiment, the user may see a message such as:

"Thank you for contacting Visa Customer Service. To help us continually improve our service to you, please click OK to rate our performance today."

In most embodiments, the message displayed in stage 615 will be actionable by the calling party. In stage 620, the user can either choose to participate in the survey, or can choose to ignore it or cancel the prompt. If the user decides to ignore the prompt, or declines to participate (e.g., by selecting "Cancel" or "No") at stage 620, the user sees no further information and his decline is automatically sent back to the Survey Xpert server in stage 630. If the user decides to participate at stage 620 (e.g., by selecting "OK" or "Yes") his selection is sent back to the server where, after receipt, additional messages to be displayed are sent back from the Survey Xpert platform to the application. In some embodiments, these additional messages with additional user response options have already been received by the application and are displayed after the user elects to participate in the survey, as shown at stage 625. In some embodiments, the second survey screen could display text such as:

Rate the service you received today:
5—Excellent
4—Good
3—Fair
2—Poor
1—Unacceptable The user's selection is sent back to the server platform in stage 635. In some embodiments, the user's MSISDN, the date and time or his response, the TAC (Type Allocation Code) of his device type, and/or a campaign ID associated with the survey campaign are also sent back to the platform.

Figure 7:
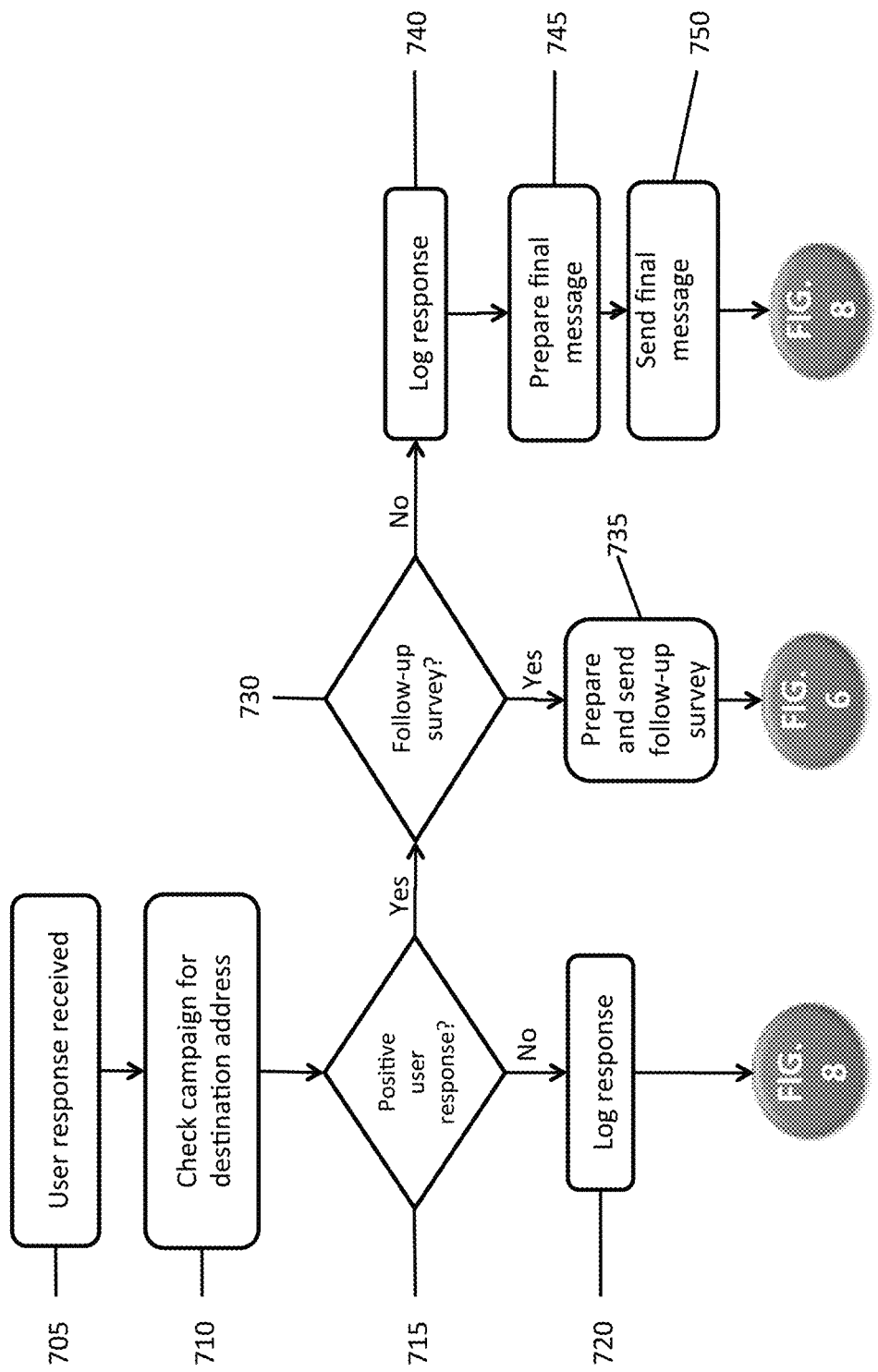
FIG. 7 is a flowchart illustrating the exemplary process of how the Survey Xpert platform logs the mobile device user's response and determines if any follow-up questions should be sent as a result of the user's response.

FIG. 7 is a flowchart of an exemplary embodiment of a process illustrating how the Survey Xpert platform logs the mobile device user's response and determines if another survey question should be sent to the user based on the initial response. At stage 705, the mobile subscriber's selected response to the survey campaign is received at the Survey Xpert platform. In stage 710, the server processes the response by, in some embodiments, checking to see if a campaign exists for the destination address. At stage 715, the server determines if the user indicated a positive or negative response. If the user did not wish to participate in the survey campaign, the server logs the user's response at stage 720 for further analysis, as defined in the flows in FIG. 8.

If the user provided a response to the campaign questions, the platform checks to determine if any follow-up questions should be sent at stage 730, based on the user's selection. If follow-up questions are defined as part of the campaign, the platform prepares the appropriate messages at stage 735 and sends these to the user. In some embodiments, the process exemplified in FIG. 6 ensues.

If there are no follow-up survey questions, the platform logs the user's initial response at stage 740. It then checks to determine if a final email or SMS should be sent to the user, based on the response provided, and prepares this message at stage 745. In one embodiment, this message could be a thank you to the user for his participation, such as:

"Thank you. Your feedback is valuable for the continuous improvement of our services.
Click here to receive 10% discount on your cash reward purchases: www.company.com reward"

At stage 750, the final message is sent to the user.

Figure 8:
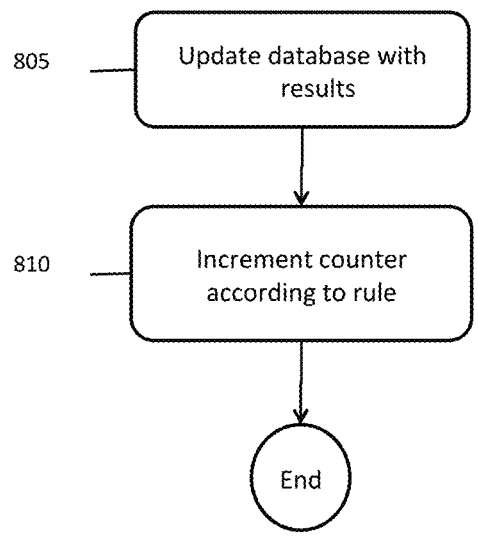
FIG. 8 is a flowchart illustrating the exemplary process of how the Survey Xpert platform updates the database with subscriber preference results, tracking the participation such that the MNO may modify the frequency of campaign depending on subscriber responsiveness.

FIG. 8 is a flowchart illustrating an exemplary embodiment of how the Survey Xpert platform updates the database with subscriber preference results. The updates can include tracking the participation such that the MNO may modify the frequency of campaign depending on subscriber responsiveness. At stage 805, the Survey Xpert server database is updated with the resulting user selection from a targeted mobile subscriber. The platform looks to determine if the mobile user responded in a positive or negative fashion at stage 810 and updates configurable counters per MSISDN accordingly.

Figure 9:
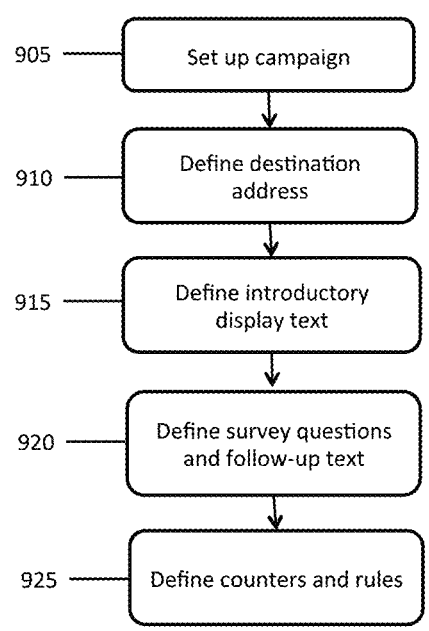
FIG. 9 is a flowchart illustrating the exemplary process of how a Survey Xpert campaign is designed.

FIG. 9 is a flowchart illustrating the exemplary process of how a Survey Xpert campaign is designed. At stage 905, the campaign is defined within the server. In some embodiments, this definition includes the days and times during which the campaign will be relevant. Specific geographic regions can also be configured. A maximum number of targeted mobile subscribers can also be set. At stage 910, called phone number(s) (destination address(es)) that will trigger the campaign are defined. Websites that could trigger the campaign (after a mobile user navigates to such a website from his device) are also defined at this stage. Next, during stage 915, the actual campaign text that will be displayed to a targeted mobile user is defined. In stage 920, the survey questions that will display to the mobile subscriber are defined. Any follow up messages after the survey is completed by a user can also be defined at this stage. In stage 925, configurable counters and rules for the campaign are set. In one embodiment, this could include the number of times a specific unique mobile subscriber, as defined by his MSISDN, is prompted to answer survey questions after dialing a business phone number.

EQUIVALENTS

It is to be understood that the foregoing description is intended to illustrate and not limit the scope of the invention, which is defined by the scope of the appended claims. Those skilled in the art will recognize, or be able to ascertain, using no more than routine experimentation, numerous equivalents to the specific embodiments described specifically in this disclosure. Such equivalents, and other aspects, advantages, and modifications are within the scope of the following claims.

The invention claimed is:

1. A computer-implemented method for automatically sending a binary class 2 SMS message, comprising instructions to create a plurality of user interfaces, to an application installed on a SIM card installed on a mobile device connected to a mobile network after a call from the mobile device to a destination address has disconnected, the method comprising:

receiving, at a server operably connected to a mobile network via an Operator Switch, Home Location Registry, or application programming interface, a first communication indicating that the mobile network has recognized a Call Disconnect event indicating that a call connected from the mobile device to the destination address has disconnected, the first communication further indicating that the destination address is associated with a business, wherein the first communication comprises a Mobile Station International Subscriber Directory Number (MSISDN) of the mobile device, a device type of the mobile device, the date and time of the call, and the destination address;

determining, at the server, a survey campaign associated with the business;

preparing, at the server, a binary class 2 SMS message, formatted for the device type and configured to be processed by the application installed on the SIM card, comprising:

a first message comprising a prompt comprising a request to answer a survey about the business and a first actionable response option configured to accept the prompt request, wherein the first message is configured to be displayed on a screen of the mobile device without user action; and a second message comprising a survey based on the survey campaign, the survey comprising a plurality of actionable response options, a command configured to launch the application installed on the SIM card, and instructions configured to instruct the application to:

create a first user interface comprising the first message;

display the first user interface on a screen of the mobile device without user action;

create a second user interface comprising the second message; and display the second user interface on the screen when if the first actionable response option is selected in the first user interface displayed on the screen;

sending, from the server, the binary class 2 SMS message to the application on the SIM card of the mobile device via a Short Message Service Center (SMSC) or Multimedia Message Service Center (MMSC) connected to the mobile network; and receiving, at the server, a second communication comprising an actionable response option selected from the plurality of actionable response options in the second user interface.

2. The method of claim 1, further comprising determining, at the server, whether the MSISDN is stored in an opt-out database operably connected to the server.

3. The method of claim 1, further comprising determining, at the server, a number of surveys previously sent from the server to the MSISDN.

4. The method of claim 1, further comprising sending, from the server to the application on the SIM card of the mobile device via a Short Message Service Center (SMSC) or Multimedia Message Service Center (MMSC) connected to the mobile network, a second binary class 2 SMS message comprising a second survey comprising a second plurality of actionable response options, and a second set of instructions configured to instruct the application to create a third interface comprising the second survey and to display the third interface on the screen.

5. The method of claim 1, further comprising receiving, at the server, a third communication comprising an indication that the first actionable response option was not selected on the mobile device.

6. The method of claim 1, further comprising determining whether the date and time of the call fall within configured date and time ranges associated with the campaign.

* * * * *